(12) United States Patent
Kosanda et al.

(10) Patent No.: US 6,482,320 B2
(45) Date of Patent: Nov. 19, 2002

(54) SOLID-LIQUID SEPARATOR

(75) Inventors: Sakae Kosanda, Kanagawa-ken (JP); Yuichi Fuchu, Tokyo (JP); Yutaka Niida, Tokyo (JP); Koichi Masuda, Tokyo (JP); Seiichi Tsuda, Kanagawa-ken (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/793,488

(22) Filed: Feb. 27, 2001

(65) Prior Publication Data

US 2001/0019027 A1 Sep. 6, 2001

(30) Foreign Application Priority Data

Mar. 1, 2000 (JP) ........................................ 2000-055452

(51) Int. Cl.$^7$ .......................... B01D 24/16; B01D 24/26; B01D 21/66; B01D 36/04; C02F 3/02

(52) U.S. Cl. ........................ 210/298; 210/151; 210/266; 210/524; 210/532.1

(58) Field of Search ................................. 210/151, 266, 210/275, 287, 295, 298, 524, 532.1

(56) References Cited

U.S. PATENT DOCUMENTS 4,885,083 A * 12/1989 Banks
5,145,589 A * 9/1992 Okubo et al.

FOREIGN PATENT DOCUMENTS

| JP | 60-232214 | 11/1985 |
| JP | 9-66286 | 3/1997 |

OTHER PUBLICATIONS

Jun Takada et al., entitled "Ultra–high–speed Granulating Sedimentation Equipment with Concentration Tank" with English translation of relevant portions. Sangyo Kikai (Industrial Machines), No. 415 (1985), pp. 23–25.

Shogo Kakuta et al., entitled "Development of the New Effluent Treatment Equipment" with English translation of relevant portions. Chemical Engineering, vol. 43, No. 6 (1998), pp. 419–424.

Shimonoseki Machinery Maintenance Office of the Fourth District Port Construction Bureau Japan Sediments Management Association, entitled "Investigation & Research of the New Effluent Treatment Equipment" with English translation of relevant portions. Hedoro, No. 68 (1997–1), pp. 51–59.

1992 Annual Report of Sewerage New Technology Institute, pp. 23–32, entitled "Development Research of Practical Space–Saving Type Sewage Treatment Technology" with English translation of relevant portions.

Takuji Nakasato et al., entitled "Rapid Filtration", PPM vol. 26, No. 8 (1995), pp. 37–43 with English translation of relevant portions.

* cited by examiner

Primary Examiner—Thomas M. Lithgow
(74) Attorney, Agent, or Firm—Wenderoth, Lind & Ponack, L.L.P.

(57) ABSTRACT

A solid-liquid separator including a separation tank, a treated water outlet (16) at the top of the tank, a sludge outlet (17) at the bottom of the tank, a draft tube (3) near the center in an upper inner zone of the tank and connected to a raw water inlet pipe (2), horizontally rotatable multistage stirring blades A (5) in the draft tube, horizontally rotatable multistage stirring blades B (6) immediately below the draft tube, a horizontal baffle (8) below the stirring blades B, a floating filter medium layer (10) around the outside of the draft tube above the stirring blades B, and a screen (12) fixed below the water level above the filter medium layer, and optionally, a filter medium-receiving screen (13) around the lower outside of the tube in combination with stirring rods (14) above the screen or aeration nozzles.

3 Claims, 6 Drawing Sheets

SOLID-LIQUID SEPARATOR

BACKGROUND OF THE INVENTION

The present invention relates to solid-liquid separators, especially used for the treatment of sewage, wastewater, polluted stream water, lake water, storm water or the like.

In conventional granulators/clarifiers having a thickener, solid-liquid separation is carried out by converting pollutants in the influent into densified pellets and thus clarified influent is passed through a clarification zone and discharged as clarified water from an effluent pipe at the top.

However, high influent flow rate causes the following problems resulting in the inclusion of pollutants in treated water.

(1) The upflow rate in the tank not only increases but also varies. Thus, slow-settling pellets are insufficiently separated.

(2) The increased upflow rate in the tank causes insufficient association of some flocs, which are discharged with upflow from the effluent pipe without forming densified pellets.

It is an object of the present invention to solve the above problems of the prior art and to provide a compact solid-liquid separator having a high sedimentation rate by limiting pollutants' outflow even when flocs are insufficiently pelletized.

SUMMARY OF THE INVENTION

In order to solve the above problems, the present invention provides a solid-liquid separator comprising a separation tank, a treated water outlet at the top of the tank, a sludge outlet at the bottom of the tank, a draft tube near the center in an upper inner zone of the tank and connected to a raw water inlet pipe, horizontally rotatable multistage stirring blades A in said draft tube, horizontally rotatable multistage stirring blades B immediately below said draft tube and having a greater diameter than that of said draft tube, a horizontal baffle below said stirring blades B, a filter medium layer consisting of a floating filter medium around the outside of said draft tube above said stirring blades B, and a screen fixed below the water level above said filter medium layer for impeding outflow of said filter medium, whereby the treated water having passed through said screen is discharged from said treated water outlet.

The solid-liquid separator may further comprise a filter medium-receiving screen around the lower outside of said draft tube and stirring rods above the screen or an aeration means. The stirring rods are rotatable and wash the filter medium during washing or even during water feeding. The aeration means aerate the filter medium layer during washing.

DETAILED DESCRIPTION OF THE INVENTION

Figure 1A:
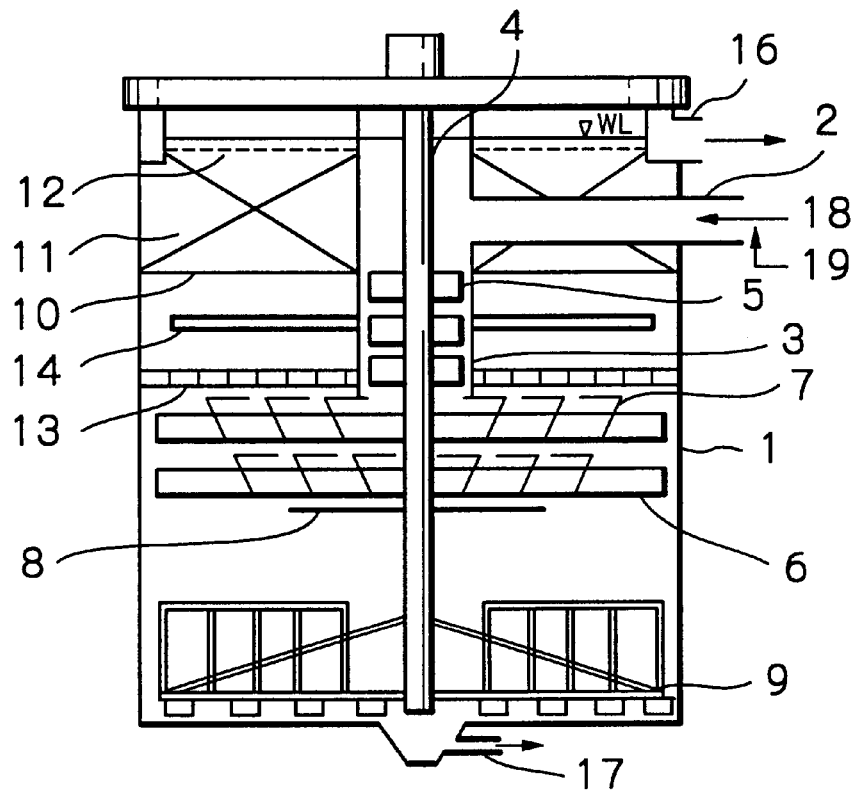
FIG. 1a shows a sectional structure of an example of a solid-liquid separator according to the present invention.

According to the present invention, a filter medium layer consisting of a floating filter medium is provided in the clarification zone of a conventional granulator/clarifier having a thickener, whereby unpelletized pollutants flowing into the clarification zone are filtered out through the filter medium layer to clarify treated water.

Accordingly, the present invention provides a solid-liquid separator comprising a separation tank, a treated water outlet at the top of the tank, a sludge outlet at the bottom of the tank, a draft tube near the center in an upper inner zone of the tank and connected to a raw water inlet pipe, horizontally rotatable multistage stirring blades A in said draft tube, horizontally rotatable multistage stirring blades B immediately below said draft tube and having a greater diameter than that of said draft tube, a horizontal baffle below said stirring blades B, a filter medium layer consisting of a floating filter medium around the outside of said draft tube above said stirring blades B, and a screen fixed below the water level in the clarification zone for impeding outflow of said filter medium, whereby water is fed upstream through said filter medium layer.

In the solid-liquid separator of the present invention, it is necessary to wash the filter medium after a certain period of operation in order to remove SS (suspended solids) accumulating in the filter medium layer during extended operation. For effective washing, a filter medium-receiving screen is preferably provided around the lower outside of the draft tube in combination with stirring rods rotatable for washing during washing or even during water feeding in or below the upper filter medium layer. Or, an aeration means for stirring the filter medium layer during washing may preferably provided. The aeration means may comprise aeration nozzles on stirring blades B or aeration nozzles fixed around the lower outside of the draft tube. The stirring rods can be fixed around the lower outside of the draft tube so that they can be rotated by rotating only the lower part of the draft tube with the rotating shaft.

The area of the baffle is preferably larger than the sectional area of the lower end opening of the draft tube. One or more annular members may be provided on said stirring blades B and picket fences and scrapers may be rotatably provided below said baffle.

The present invention will now be explained in detail with reference to the attached drawings.

FIGS. 1–4 show sectional structures of various examples of solid-liquid separators according to the present invention, and FIGS. 5 and 6 illustrate operations and water levels during water feeding and washing.

In the drawings, numeral references represent the following elements: 1: solid-liquid separator (separation tank), 2: raw water inlet pipe, 3: draft tube, 4: rotating shaft, 5: stirring blade A, 6: stirring blade B, 7: annular member, 8:

baffle, 9: picket fence and scraper, 10: filter medium layer, 11: filter medium, 12: screen, 13: filter medium-receiving screen, 14: stirring rod, 15: aeration nozzle on stirring blade B, 15': fixed aeration nozzle, 16: treated water outlet pipe, 17: thickened sludge outlet pipe, 18: raw water, 19: coagulant (polymer).

First, an example of the present invention is explained with reference to FIG. 1a. A solid-liquid separator (separation tank) 1 comprises an outlet pipe for treated water or clarified water 16 at the top, an outlet pipe for thickened sludge 17 at the bottom, a draft tube 3 extending from the top to the near mid-height along the center axis of separation tank 1, an inlet pipe for raw water or water to be treated 2 opening to an upper part of draft tube 3, a rotating shaft 4 extending to the bottom of the tank along the center line in the draft tube, and multistage stirring blades A 5 fixed to rotating shaft 4 at a lower part in the draft tube. Furthermore, multistage stirring blades B 6 having a greater diameter than that of draft tube 3 and having an annular member 7 are fixed to the rotating shaft immediately below said tube. Below said stirring blades B 6, a baffle 6 having a larger area than that of the opening of said tube 3 is fixed to rotating shaft 4. At the bottom of tank 1, picket fences and scrapers 9 are fixed to rotating shaft 4.

Around the outer periphery of draft tube 3 in tank 1, a filter medium-receiving screen 13, stirring rods 14 rotatable by rotating shaft 4, a filter medium layer 10 consisting of a filter medium 11, and a screen 12 fixed below the water level above said filter medium layer for impeding outflow of said filter medium are successively provided from bottom to top.

Figure 1B:
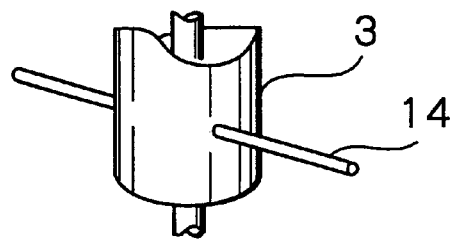
FIG. 1b shows a part of FIG. 1a where stirring rods are provided.
Figure 1C:
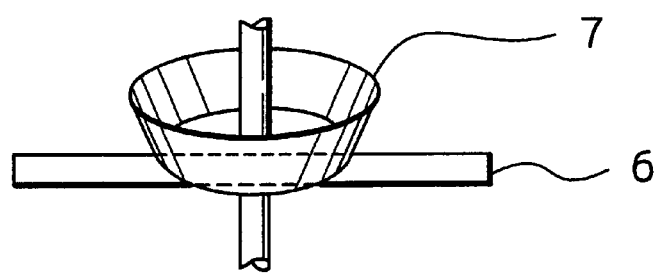
FIG. 1c shows a part of FIG. 1a where stirring blades B are provided.

FIG. 1b shows a part of FIG. 1a where stirring rods 14 are provided, and FIG. 1c shows the part where stirring blades B 6 and annular members 7 are provided.

Then, the operation of solid-liquid separator 1 is explained with reference to FIGS. 1 and 5.

Water to be treated (raw water) 18 dosed with a coagulant (polymer) 19 is supplied from raw water inlet pipe 2 into draft tube 3 where it is stirred with stirring blades A 5, then discharged from the lower opening of draft tube 3 and further stirred with stirring blades B 6, whereby pollutants in the water to be treated (raw water) are converted into densified pellets, which settle at the bottom of tank 1 and collected by scrapers 9 and discharged from thickened sludge outlet pipe 17.

However, slow-settling pellets among those formed by stirring blades B 6 and flocs incapable of forming densified pellets will not settle but rise together with treated water toward the top of tank 1. These rising pellets and flocs are separated and removed from treated water through the filter medium layer 10 provided around the upper outer periphery of the draft tube and thus clarified treated water is discharged from treated water outlet pipe 16.

Figure 5A:
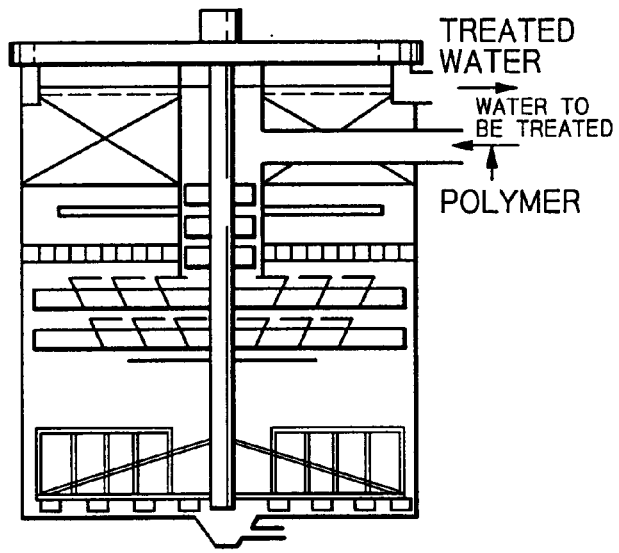
FIGS. 5a–5d illustrate operations and water levels of the separator shown in FIG. 1 during water feeding and washing.
Figure 5B:
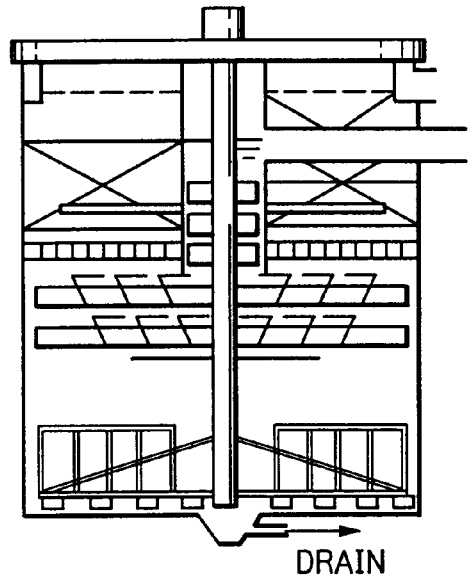
Figure 5C:
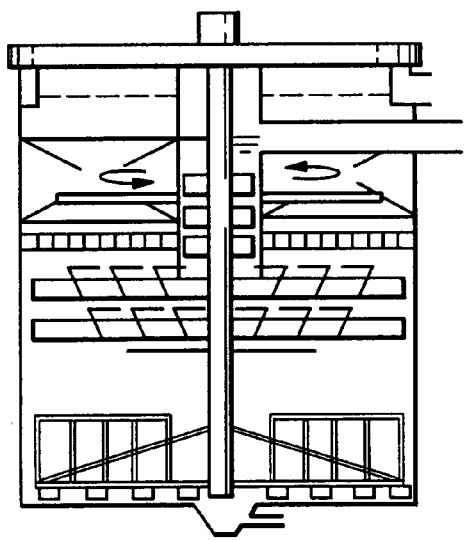
Figure 5D:
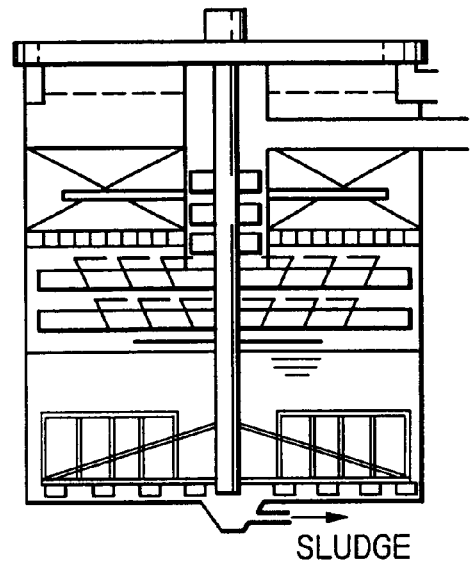
Figure 6A:
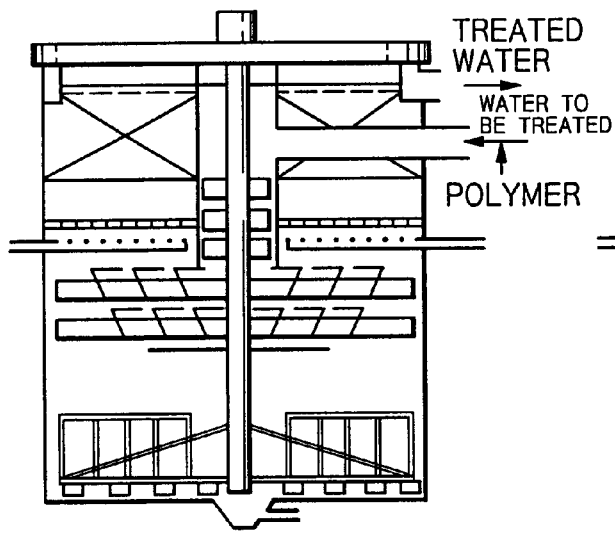
FIGS. 6a–6d illustrate operations and water levels of the separator shown in FIG. 4 during water feeding and washing.
Figure 6B:
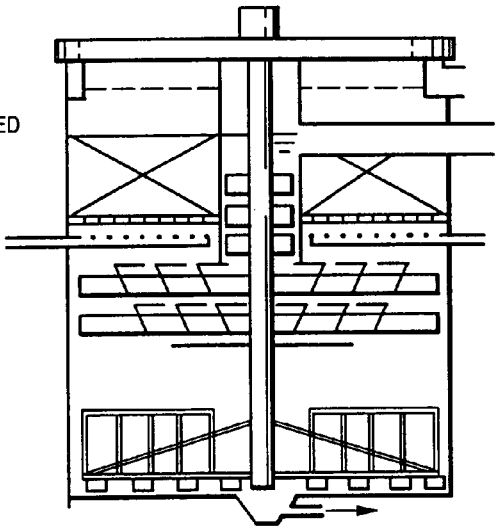
Figure 6C:
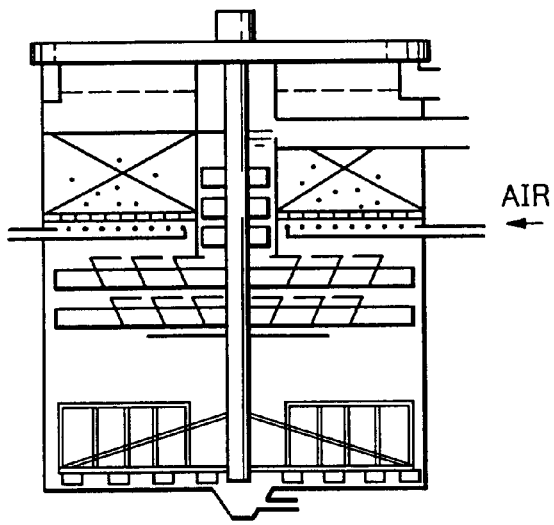
Figure 6D:
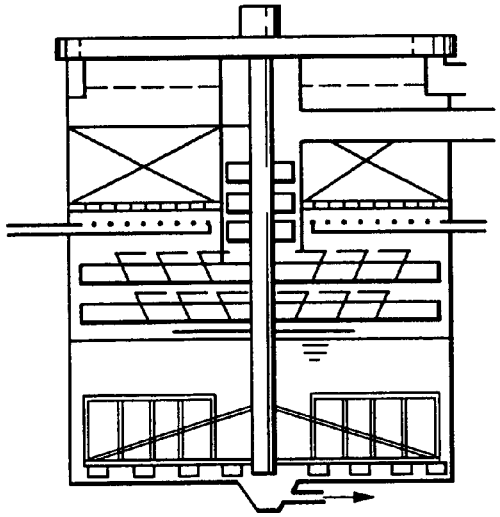

Thus, solids (pollutants) in water to be treated are separated to provide clarified treated water during ordinary water feeding (FIG. 5a). Then, filter medium 11 is washed to remove SS accumulating in filter medium layer 10 during extended operation. In this case, the tank is drained so that the water level is lowered below screen 12 and the entire filter medium floats and stirring rods 14 are situated in filter medium layer 10 (FIG. 5b). Then, filter medium 11 is stirred by rotating stirring rods 14 and rotating shaft 4 to remove SS deposited or built up on the filter medium (FIG. 5c). After still standing, sludge settling at the bottom of the tank is discharged (FIG. 5d). After washing the filter medium in this manner, ordinary water-feeding operation can be resumed.

Figure 2:
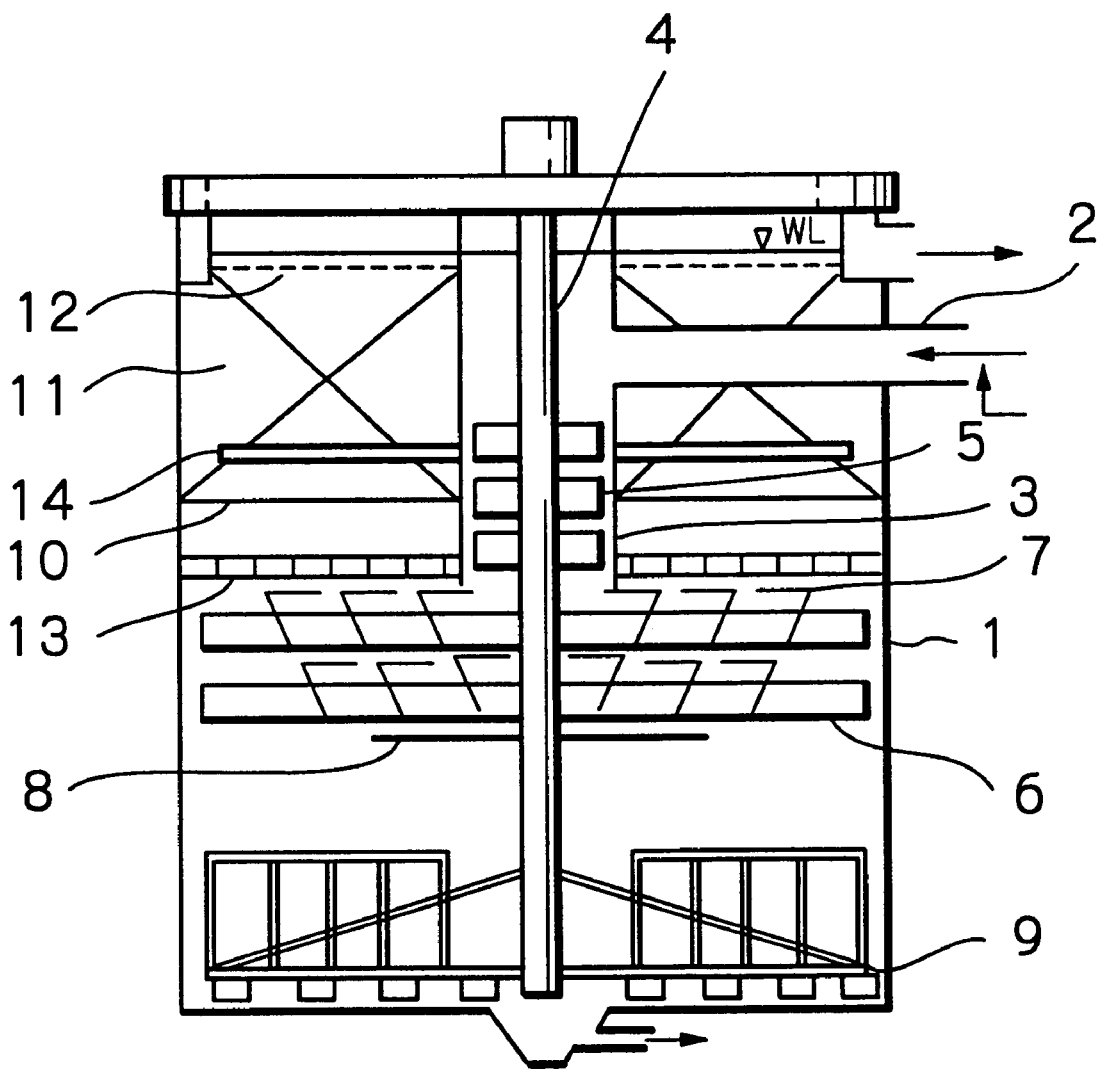
FIG. 2 shows a sectional structure of another example of a solid-liquid separator according to the present invention.

FIG. 2 shows a sectional structure of another example of a solid-liquid separator according to the present invention, which differs from FIG. 1 only in that stirring rods 14 are provided in filter medium layer 10 so that the filter medium can be washed even during water feeding whereby flocs associate with each other in the filter medium to settle as larger particles. The operation during washing is similar to FIG. 1 to attain similar functions and effects.

Figure 3A:
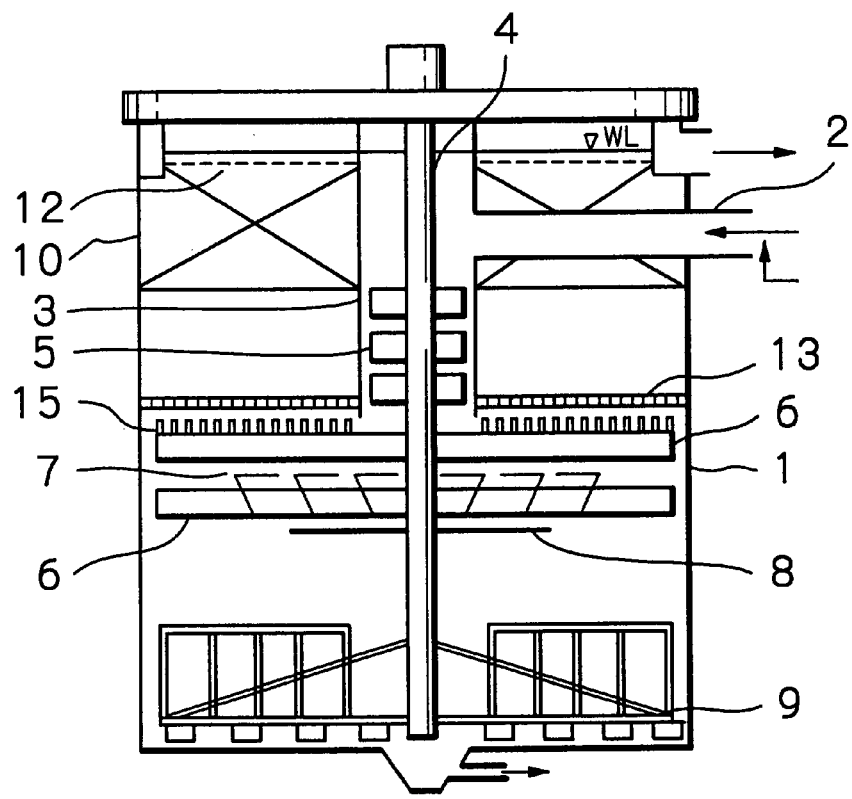
FIG. 3a shows a sectional structure of another example of a solid-liquid separator according to the present invention.
Figure 3B:
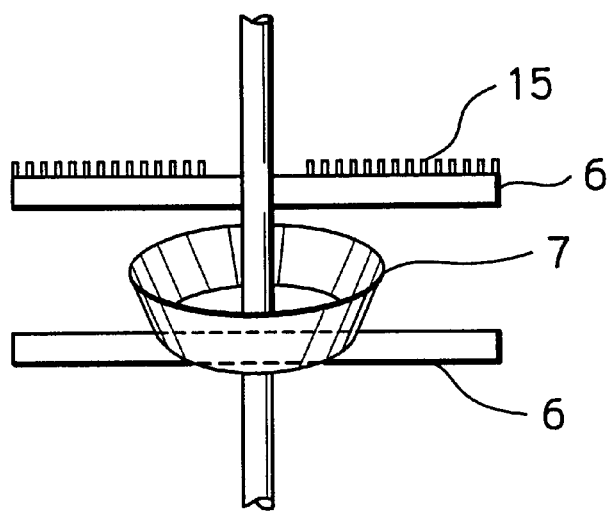
FIG. 3b shows a part of FIG. 3a where stirring blades B are provided.

FIG. 3a shows a sectional structure of another example of a solid-liquid separator according to the present invention, and FIG. 3b shows a part of FIG. 3a where stirring blades B are provided. FIG. 3 differs from FIG. 1 only in that stirring rods 14 in FIG. 1 are replaced by aeration nozzles 15 on uppermost stirring blades B 6 whereby the filter medium layer is stirred by aeration from aeration nozzles 15 through an air duct extending through rotating shaft 4 in place of stirring rods 14 to remove SS in the filter medium during washing. This system also has similar functions and effects to those of FIG. 1.

Figure 4A:
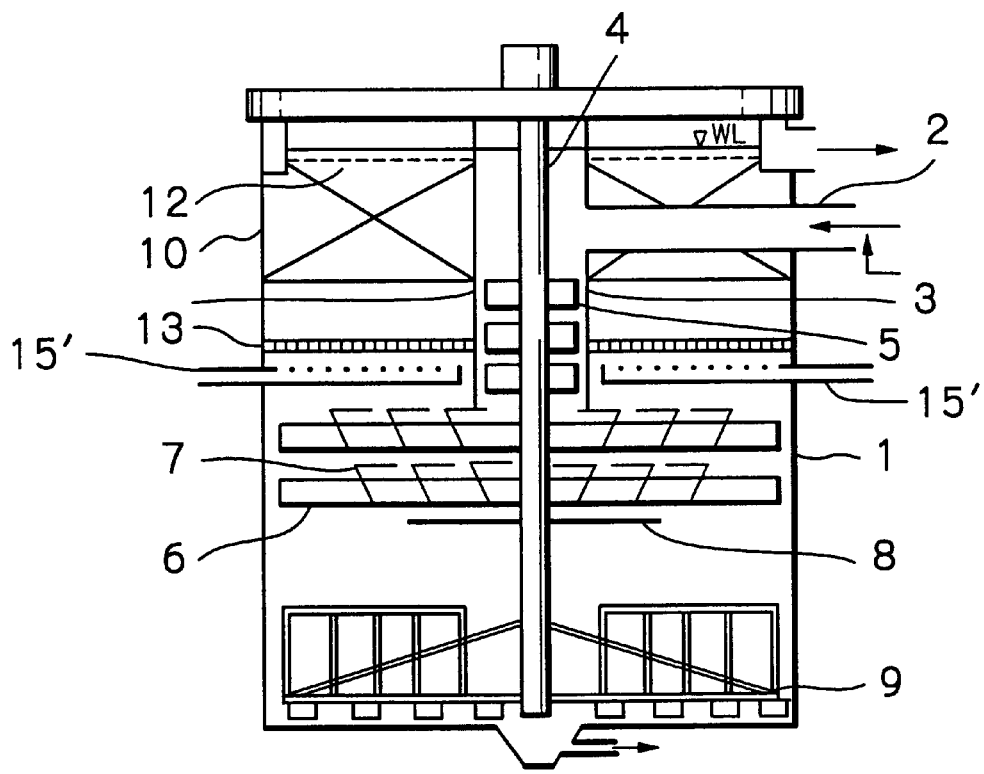
FIG. 4a shows a sectional structure of another example of a solid-liquid separator according to the present invention.
Figure 4B:
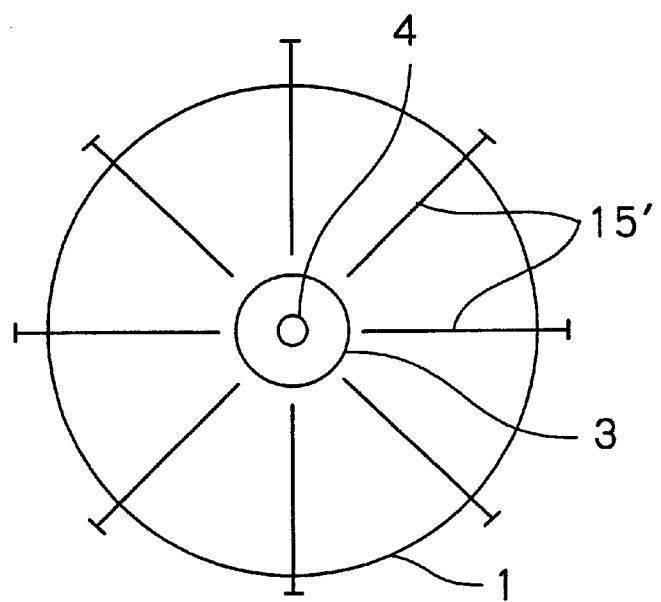
FIG. 4b shows a part of FIG. 4a where aeration nozzles are provided.

FIG. 4a shows a sectional structure of another example of a solid-liquid separator according to the present invention, and FIG. 4b shows the part where aeration nozzles 15' are provided. FIG. 4 differs from FIG. 3 only in that aeration nozzles 15' are fixed. Aeration nozzles 15' are provided around the outer periphery of draft tube 3 below filter medium layer 10 in the tank.

Referring to FIG. 6 illustrating the solid-liquid separator shown in FIG. 4 during water feeding and washing, filter medium 11 is washed to remove SS accumulating in filter medium layer 10 during extended operation. In this case, the tank is drained so that the water level is lowered below screen 12 (FIG. 6b) and the filter medium is effectively washed by injecting air from aeration nozzles 15' (FIG. 6c). Then, air injection from aeration nozzles 15' is stopped, and after still standing, sludge settling at the bottom of the tank is discharged (FIG. 6d).

This system also ensures water feeding and washing similarly to the solid-liquid separator shown in FIG. 1 to attain similar functions and effects.

ADVANTAGES OF THE INVENTION

The present invention successfully provided a compact solid-liquid separator having a high sedimentation rate and a high water surface loading which can limit pollutants' outflow even when flocs are insufficiently pelletized and which ensures stable long-term operation, by using a structure wherein a floating filter medium layer which can be regularly washed is provided at the top as described above.

What is claimed is:

1. A solid-liquid separator comprising:

a separation tank;

a raw water inlet pipe;

a treated water outlet at the top of the tank;

a sludge outlet at the bottom of the tank;

a draft tube near the center of the tank in an upper inner zone of the tank, said draft tube being connected to said raw water inlet pipe;

horizontally rotatable multistage stirring blades A located in said draft tube;

horizontally rotatable multistage stirring blades B located immediately below said draft tube and having a greater diameter than that of said draft tube;

a horizontal baffle below said stirring blades B;

a filter medium layer comprising a floating filter medium around the outside of said draft tube above said stirring blades B; and a screen fixed below a water level above said filter medium layer for impeding outflow of said filter medium, whereby the treated water having passed through said screen is discharged from said treated water outlet.

2. The solid-liquid separator according to claim 1, further comprising a filter medium-receiving screen positioned around the lower outside of said draft tube and stirring rods provided above said filter medium-receiving screen, said stirring rods being rotatable for washing said filter medium during a filter medium washing operation or even during water feeding.

3. The solid-liquid separator according to claim 1, further comprising a filter medium-receiving screen around the lower outside of said draft tube and an aeration means for aerating said filter medium layer during a filter medium washing operation.

* * * * *